United States Patent
Yoshida

(10) Patent No.: US 7,750,934 B2
(45) Date of Patent: Jul. 6, 2010

(54) IMAGE FORMING APPARATUS AND CONTROL METHOD THEREOF

(75) Inventor: Hidefumi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/852,128

(22) Filed: Sep. 7, 2007

(65) Prior Publication Data

US 2008/0062399 A1    Mar. 13, 2008

(30) Foreign Application Priority Data

Sep. 11, 2006   (JP)   ............................. 2006-246002

(51) Int. Cl.
   *B41J 2/435*   (2006.01)
   *B41J 2/47*    (2006.01)
(52) U.S. Cl. ...................... 347/246; 347/253
(58) Field of Classification Search .................. 399/48, 399/51, 159, 168
   See application file for complete search history.

(56) References Cited

U.S. PATENT DOCUMENTS 4,794,413 A * 12/1988 Yamazaki et al. ........... 347/247

FOREIGN PATENT DOCUMENTS

| JP | 2004-258482 A | 9/2004 |
| JP | 2004-345170 A | 12/2004 |

* cited by examiner

*Primary Examiner*—Matthew Luu
*Assistant Examiner*—Kendrick X Liu
(74) *Attorney, Agent, or Firm*—Canon U.S.A., Inc., IP Division

(57) ABSTRACT

An image forming apparatus is capable of controlling an exposure in accordance with sensitivity variations of a photosensitive body. An actual exposure position ($P_r$) sometimes precedes an exposure position ($P_c$) recognized based on the count value (C). In this case, the correction value ($D_c$) of the exposure position ($P_c$) recognized based on the count value (C) is calculated by linear interpolation using reference correction values ($D_0-D_n$) corresponding to the position until the home position (HP) of a photosensitive drum is detected. When the home position (HP) is detected, the correction value ($D_c(P_{c0})$) of an exposure position ($P_c$) recognized after detecting the home position (HP) is so calculated as to make the difference between the correction value of the exposure position and that of a previous exposure position ($P_{r'}$) fall within a preset range ($\alpha$).

5 Claims, 12 Drawing Sheets

IMAGE FORMING APPARATUS AND CONTROL METHOD THEREOF

BACKGROUND OF THE INVENTION

1. Field of the Invention

The present invention relates to an electrophotographic image forming apparatus using a laser source and a control method thereof.

2. Description of the Related Art

In an electrophotographic image forming apparatus using a laser source, a uniformly charged photosensitive drum rotates in a predetermined direction (sub-scanning direction), and the laser source emits a laser beam corresponding to an image signal. While scanned right and left (main scanning direction), the laser beam irradiates the photosensitive drum, forming an electrostatic latent image on it. The developing unit supplies toner to the photosensitive drum to visualize the electrostatic latent image on the photosensitive drum into a toner image.

An image forming process using a laser beam will be explained with reference to FIGS. 9 to 12B. FIG. 9 is a view schematically showing the potential relationship between a portion irradiated with a laser beam and an unirradiated portion on the photosensitive drum. FIG. 10 is a view schematically showing toner attachment states at portions irradiated with laser beams of different irradiation pulse widths on the photosensitive drum. FIG. 11 is a view showing toner attachment states at portions irradiated with laser beams of the same light quantity on the photosensitive drum. FIGS. 12A and 12B are graphs schematically showing sensitivity variations of the photosensitive drum in the main scanning direction and sub-scanning direction.

If a laser beam L irradiates the photosensitive drum uniformly charged to a potential $V_D$, the potential of a portion irradiated with the laser beam L drops to a potential $V_L$ lower than the potential $V_D$, as shown in FIG. 9. Toner supplied from the developing unit attaches to the portion at the potential $V_L$, forming a toner image.

The laser source is ON/OFF-controlled to change the irradiation pulse width of the laser beam based on an image signal. This control method, called PWM, changes the ratio of the ON and OFF periods of the laser source. For example, the laser source can irradiate the photosensitive drum with a laser beam L1 and a laser beam L2 narrower in pulse width than the laser beam L1, as shown in FIG. 10. The amount of toner attached to a portion irradiated with the laser beam L1 is larger than that attached to a portion irradiated with the laser beam L2. That is, the amount of attached toner changes to express the density of an image transferred onto paper by changing the ratio of the ON and OFF periods of the laser source.

However, even if laser beams L3 of the same light quantity irradiate the photosensitive drum, sensitivity variations between portions on the photosensitive drum result in different potentials $V_{L3}$ and $V_{L4}$, as shown in FIG. 11, and the image density may vary. For example, a highly durable amorphous silicon photosensitive drum readily varies in film thickness and film quality in the manufacture. Variations in film thickness and film quality lead to variations in sensitivity to electrification and exposure. When a predetermined quantity of laser beam irradiates the amorphous silicon photosensitive drum, potential variations as shown in FIG. 12A occur in the main scanning direction of the photosensitive drum, and those as shown in FIG. 12B occur in the sub-scanning direction.

To solve these problems, there has been proposed a technique of downloading, from a data server, correction data to correct sensitivity variations unique to each photosensitive body (photosensitive drum), and correcting laser power in accordance with the exposure position on the photosensitive body based on the correction data (see, e.g., Japanese Patent Laid-Open No. 2004-345170).

There has also been proposed a technique of rotating a photosensitive body while scanning a surface electromer in the main scanning direction, spirally measuring sensitivity variations by one turn of the photosensitive body, and correcting the exposure in accordance with the exposure position on the photosensitive body using the measurement result (see, e.g., Japanese Patent Laid-Open No. 2004-258482). To detect the rotational position of the photosensitive body, the photosensitive body comprises a home position member (HP indication means) indicating the home position. The photosensitive body also comprises a home position sensor (HP detection means) which detects the home position member. The home position sensor is positioned to detect the home position member when the home position member reaches a preset reference position (home position). The number of main scanning lines is counted from the detected home position serving as a reference. The rotational position of the photosensitive body, that is, the exposure position on the photosensitive body is calculated from the count value. The calculated exposure position and measured photosensitive body sensitivity are held in correspondence with each other.

When the above-mentioned techniques are applied, the exposure position on the photosensitive drum must be accurately calculated in actual image formation in order to correct the exposure in accordance with the exposure position on the photosensitive body. This is because correction data corresponding to the exposure position must be used.

In actual image formation, however, the rotational speed of the photosensitive drum may temporarily vary due to, for example, impact force acting on the photosensitive drum when paper enters between the photosensitive drum and the intermediate transfer belt. Thus, an exposure position on the photosensitive drum that is calculated based on the number of main scanning lines counted from the home position serving as a reference may not coincide with an exposure position on the photosensitive drum in actual image formation. Correction data which should be used for an actual exposure position may become different from correction data corresponding to an exposure position on the photosensitive drum that is calculated from the home position serving as a reference. It is, therefore, difficult to properly control the exposure in accordance with sensitivity variations of the photosensitive drum.

SUMMARY OF THE INVENTION

An embodiment of the present invention provides an image forming apparatus capable of controlling an exposure (e.g., controlling an intensity of a laser beam emitted onto a surface of a photosensitive body) in accordance with sensitivity variations of a photosensitive body, and a control method thereof.

According to one aspect of the present invention, an embodiment is directed to an image forming apparatus comprising a photosensitive body, an exposure unit adapted to expose a surface of the photosensitive body, a holding unit adapted to hold reference correction values of sensitivity that correspond to respective positions aligned in a rotational direction from a specific position serving as a start point on the photosensitive body, a detection unit adapted to detect the specific position when the specific position on the photosensitive body reaches a preset reference position, a recognition unit adapted to recognize an exposure position on the photosensitive body by using the specific position as the start point each time the detection unit detects the specific position, a correction value calculation unit adapted to calculate a correction value of sensitivity for each recognized exposure position by referring to the reference correction values of the respective positions held by the holding unit and an exposure control unit adapted to control an exposure of the exposure unit on the basis of the correction value of sensitivity for each recognized exposure position, wherein when the specific position on the photosensitive body is detected before the specific position or a position preceding the specific position is recognized as an exposure position, the correction value calculation unit calculates a correction value of an exposure position recognized after the detection unit detects the specific position, so as to make a difference between the correction value of the exposure position and a correction value of a previous exposure position fall within a preset range.

According to another aspect of the present invention, an embodiment is directed to an image forming apparatus comprising a photosensitive body, an exposure unit adapted to expose a surface of the photosensitive body, a holding unit adapted to hold reference correction values of sensitivity that correspond to respective positions aligned in a rotational direction from a specific position serving as a start point on the photosensitive body, a detection unit adapted to detect the specific position when the specific position on the photosensitive body reaches a preset reference position, a recognition unit adapted to recognize an exposure position on the photosensitive body by using the specific position as the start point each time the detection unit detects the specific position, a correction value calculation unit adapted to calculate a correction value of sensitivity for each recognized exposure position by referring to the reference correction values of the respective positions held by the holding unit and an exposure control unit adapted to control an exposure of the exposure unit on the basis of the correction value of sensitivity for each recognized exposure position, wherein when the recognition unit recognizes the specific position or a position preceding the specific position as a current exposure position before the detection unit detects the specific position, the correction value calculation unit applies a correction value of an exposure position subsequent to the position recognized as the current exposure position as a correction value of the position recognized as the current exposure position until the detection unit detects the specific position on the photosensitive body.

According to still another aspect of the present invention, an embodiment is directed to an image forming apparatus comprising a photosensitive body, an exposure unit adapted to expose a surface of the photosensitive body, a holding unit adapted to hold reference correction values of sensitivity that correspond to respective positions aligned in a rotational direction from a specific position serving as a start point on the photosensitive body, a detection unit adapted to detect the specific position when the specific position on the photosensitive body reaches a preset reference position, a recognition unit adapted to recognize an exposure position on the photosensitive body by using the specific position as the start point each time the detection unit detects the specific position, a correction value calculation unit adapted to calculate a correction value of sensitivity for each recognized exposure position by referring to the reference correction values of the respective positions held by the holding unit, and an exposure control unit adapted to control an exposure of the exposure unit on the basis of the correction value of sensitivity for each recognized exposure position, wherein when the detection unit detects the specific position on the photosensitive body before the recognition unit recognizes the specific position or a position preceding the specific position as an exposure position, the correction value calculation unit returns a correction value of an exposure position recognized when the specific position is detected, to a reference correction value corresponding to the specific position.

According to yet another aspect of the present invention, an embodiment is directed to an method of controlling an image forming apparatus having a photosensitive body, an exposure unit which exposes a surface of the photosensitive body, and a holding unit which holds reference correction values of sensitivity that correspond to respective positions aligned in a rotational direction from a specific position serving as a start point on the photosensitive body. The method comprises detecting the specific position when the specific position on the photosensitive body reaches a preset reference position, recognizing an exposure position on the photosensitive body by using the specific position as the start point each time the specific position is detected, calculating a correction value of sensitivity for each recognized exposure position by referring to the reference correction values of the respective positions held by the holding unit, and controlling an exposure of the exposure unit on the basis of the correction value of sensitivity for each recognized exposure position. When the specific position on the photosensitive body is detected before the specific position or a position preceding the specific position is recognized as an exposure position, a correction value of an exposure position recognized after detecting the specific position detected is calculated so as to make a difference between the correction value of the exposure position and a correction value of a previous exposure position fall within a preset range.

According to yet still another aspect of the present invention, an embodiment is directed to an method of controlling an image forming apparatus having a photosensitive body, an exposure unit which exposes a surface of the photosensitive body, and a holding unit which holds reference correction values of sensitivity that correspond to respective positions aligned in a rotational direction from a specific position serving as a start point on the photosensitive body. The method comprises detecting the specific position when the specific position on the photosensitive body reaches a preset reference position, recognizing an exposure position on the photosensitive body by using the specific position as the start point each time the specific position is detected, calculating a correction value of sensitivity for each recognized exposure position by referring to the reference correction values of the respective positions held by the holding unit, and controlling an exposure of the exposure unit on the basis of the correction value of sensitivity for each recognized exposure position. When the specific position or a position preceding the specific position is recognized as a current exposure position before the specific position is detected, a correction value of an exposure position subsequent to the position recognized as the current exposure position is applied as a correction value of the position recognized as the current exposure position until the specific position is detected.

According to still yet another aspect of the present invention, an embodiment is directed to a method of controlling an image forming apparatus having a photosensitive body, an exposure unit which exposes a surface of the photosensitive body, and a holding unit which holds reference correction values of sensitivity that correspond to respective positions aligned in a rotational direction from a specific position serving as a start point on the photosensitive body. The method comprises detecting the specific position when the specific position on the photosensitive body reaches a preset reference position, recognizing an exposure position on the photosensitive body by using the specific position as the start point each time the specific position is detected, calculating a correction value of sensitivity for each recognized exposure position by referring to the reference correction values of the respective positions held by the holding unit and controlling an exposure of the exposure unit on the basis of the correction value of sensitivity for each recognized exposure position. When the specific position is detected before the specific position or a position preceding the specific position is recognized as an exposure position, a correction value of an exposure position recognized when the specific position is detected returns to a reference correction value corresponding to the specific position.

Further features of the present invention will become apparent from the following description of exemplary embodiments (with reference to the attached drawings).

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
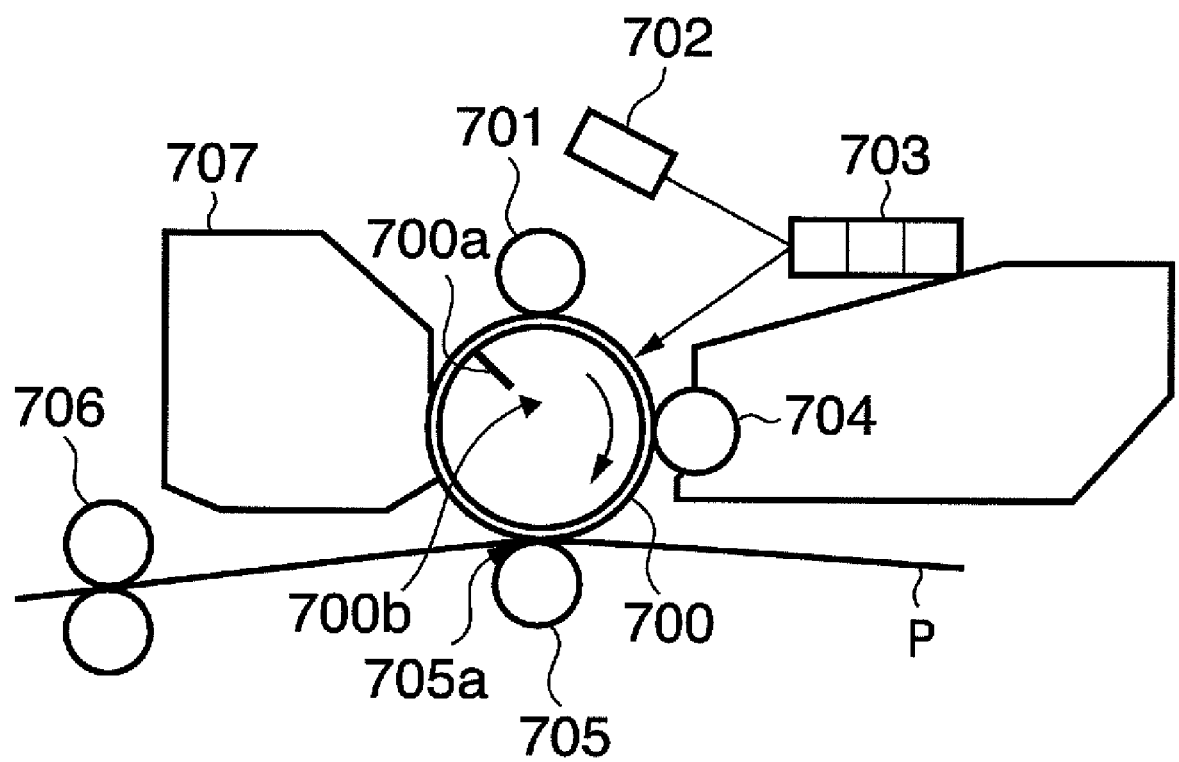
FIG. 1 is a longitudinal sectional view showing the arrangement of the main part of an image forming apparatus according to the first embodiment of the present invention.

FIG. 1 is a longitudinal sectional view showing the arrangement of the main part of an image forming apparatus according to the first embodiment of the present invention.

As shown in FIG. 1, the image forming apparatus according to the first embodiment is operable to perform an electrophotographic process. The image forming apparatus comprises a photosensitive drum 700, contact charging roller 701, exposure unit 702, polygon mirror 703, developing unit 704, transfer roller 705, fixing unit 706, and cleaning unit 707.

The photosensitive drum 700 is formed from an aluminum cylinder covered with a photoconductive layer of an inorganic photosensitive material such as amorphous silicon. The aluminum cylinder is grounded. A driving motor (not shown) drives the photosensitive drum 700 to rotate clockwise (direction indicated by the arrow) at a preset peripheral speed (process speed). The photosensitive drum 700 comprises a home position member 700a. The home position member 700a is arranged at a home position HP (specific position) serving as the reference of the rotational position on the photosensitive drum 700. A home position sensor 700b detects the home position member 700a. More specifically, the home position sensor 700b is positioned to detect the home position member 700a when the home position member 700a reaches a predetermined reference position (not shown). An output from the home position sensor 700b is used to recognize an exposure position on the photosensitive drum 700 and calculate a correction value for controlling the exposure in accordance with the exposure position.

The contact charging roller 701 rotates following the rotation of the photosensitive drum 700. A charging high-voltage power supply (not shown) applies a preset voltage to the contact charging roller 701, uniformly charging the surface of the photosensitive drum 700 to a potential of a preset polarity. The exposure unit 702 emits a laser beam corresponding to an image signal. While scanned in the main scanning direction by the polygon mirror 703, the laser beam irradiates the surface of the photosensitive drum 700, forming an electrostatic latent image on the surface of the photosensitive drum 700. The intensity (laser beam quantity) of the laser beam emitted from the exposure unit 702, that is, the exposure to the photosensitive drum 700 is controlled in accordance with sensitivity variations at the exposure position on the photosensitive drum 700, which will be described later. The exposure control arrangement will be explained later.

The electrostatic latent image on the photosensitive drum 700 is visualized as a toner image with toner supplied from the developing unit 704. At a transfer nip 705a formed between the transfer roller 705 and the photosensitive drum 700, the toner image is transferred onto a sheet P fed from a feeding unit (not shown) to the transfer nip 705a. At this time, the transfer roller 705 receives a transfer bias voltage of a polarity opposite to the toner charging polarity.

The sheet P bearing the toner image is supplied to the fixing unit 706. The fixing unit 706 fixes the toner image onto the sheet P by heating and pressing the toner image on the sheet P. The sheet P bearing the toner image fixed to it is discharged outside the image forming apparatus via a discharge roller (not shown).

After the end of transfer of the toner image from the photosensitive drum 700 to a sheet, the cleaning unit 707 cleans the surface of the photosensitive drum 700 to remove residual toner from the surface of the photosensitive drum 700. Then, the photosensitive drum 700 prepares for the next image formation.

Figure 2:
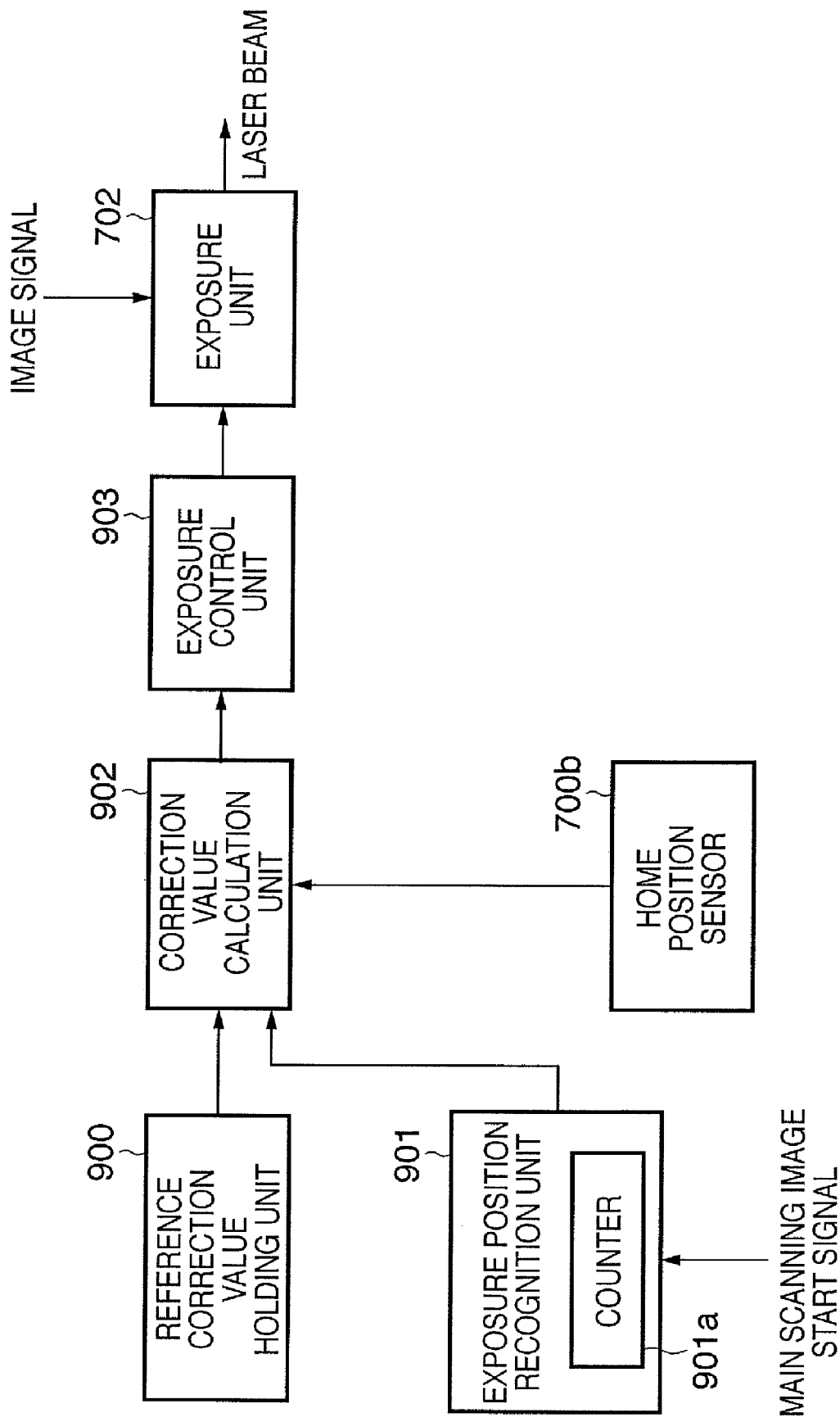
FIG. 2 is a block diagram showing an exposure control arrangement to control the exposure using a correction value for correcting the sensitivity of a photosensitive drum 700 in FIG. 1 in the sub-scanning direction (rotational direction)
Figure 3:
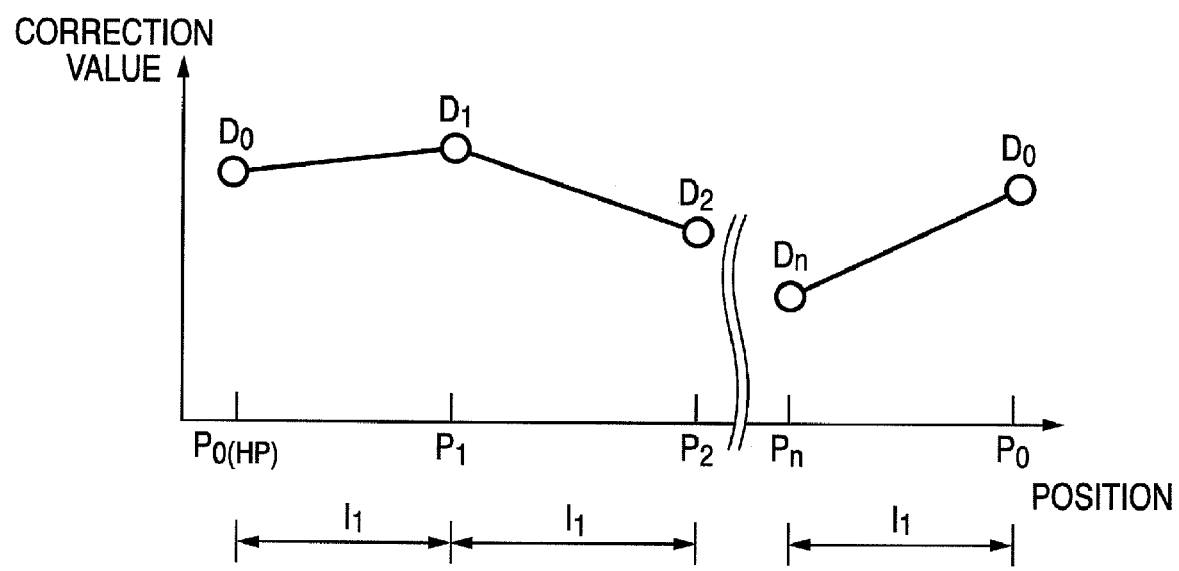
FIG. 3 is a graph schematically showing the correspondence between each reference correction value held in a reference correction value holding unit 900 in FIG. 2 and each position on the photosensitive drum 700.
Figure 4:
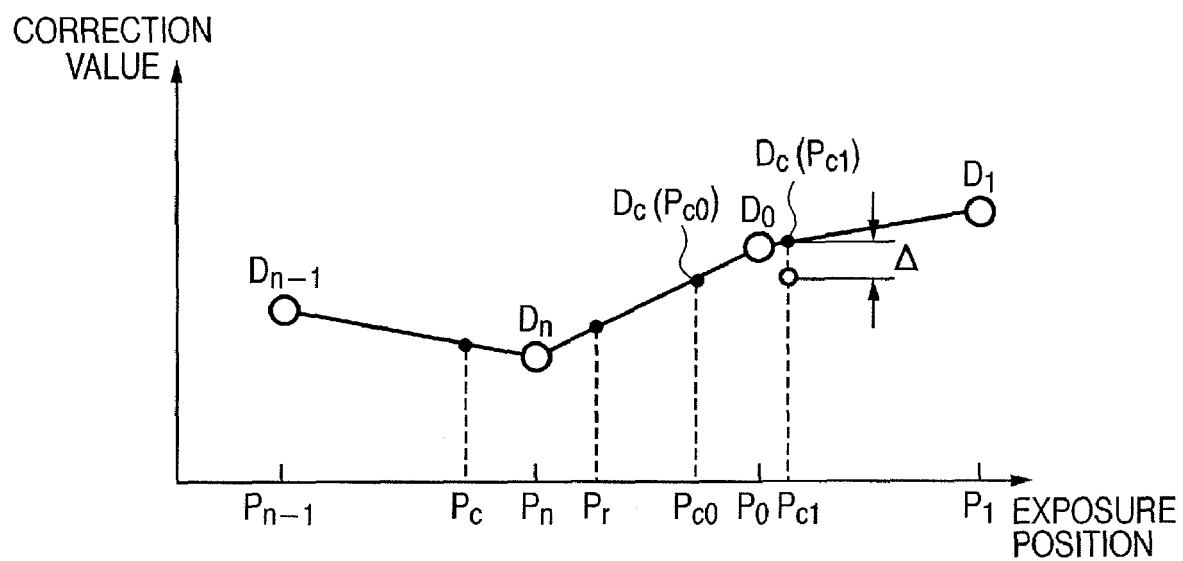
FIG. 4 is a graph schematically showing the difference between correction values when an exposure position recognized by an exposure position recognition unit 901 based on the number of main scanning lines deviates from an actual exposure position.

The exposure control arrangement according to the first embodiment will be described with reference to FIGS. 2 to 4. FIG. 2 is a block diagram showing the exposure control arrangement to control the exposure using a correction value for correcting the sensitivity of the photosensitive drum 700 in FIG. 1 in the sub-scanning direction (rotational direction). FIG. 3 is a graph schematically showing the correspondence between each reference correction value held in a reference correction value holding unit 900 in FIG. 2 and each position on the photosensitive drum 700. FIG. 4 is a graph schematically showing the difference between correction values when an exposure position recognized by an exposure position recognition unit 901 on the basis of the number of main scanning lines deviates from an actual exposure position.

The first embodiment uses a control arrangement to calculate for each exposure position a correction value for correcting the sensitivity of the photosensitive drum 700 in the sub-scanning direction (rotational direction), and control the exposure of the exposure unit 702 based on the correction value.

As shown in FIG. 2, the control arrangement to control the exposure of the exposure unit 702 comprises the reference correction value holding unit 900, the exposure position recognition unit 901, a correction value calculation unit 902, and an exposure control unit 903.

The reference correction value holding unit 900 stores reference correction values $D_0$ to $D_n$ for correcting the sensitivity of the photosensitive drum 700 in the sub-scanning direction (rotational direction). As shown in FIG. 3, a position $P_0$ is the home position HP on the photosensitive drum 700, and the reference correction value $D_0$ corresponds to the position $P_0$. The reference correction values $D_1$ to $D_n$ correspond to positions $P_1$ to $P_n$ on the photosensitive drum 700. The positions $P_0$ to $P_n$ are set at equal intervals $I_1$ sequentially along the outer surface of the photosensitive drum 700 from the home position $P_0$ to the upstream side in the rotational direction of the photosensitive drum 700. The interval $I_1$ is a distance corresponding to a preset number of main scanning lines. For example, the interval $I_1$ corresponds to 10 main scanning lines in the sub-scanning direction. The main scanning line is a line exposed to a laser beam in the main scanning direction on the photosensitive drum 700. The intervals between main scanning lines are equal intervals set in accordance with resolution or the like.

The reference correction values $D_1$ to $D_n$ are set for the respective positions $P_1$ to $P_n$ at the intervals $I_1$ each serving as a distance corresponding to a preset number of scanning lines. Alternatively, a correction value may be set for each scanning line if the reference correction value holding unit 900 storing reference correction values has sufficient storage capacity.

The exposure position recognition unit 901 incorporates a counter 901a. The counter 901a starts counting the number of main scanning lines exposed in the main scanning direction every time the home position sensor 700b detects the home position member 700a, that is, home position HP of the photosensitive drum 700. A count value C representing the number of main scanning lines is incremented by one every time a main scanning image start signal (BD (Beam Detect) signal) representing the start of image formation in the main scanning direction is input. Based on the count value C of the counter 901a, the exposure position recognition unit 901 recognizes the current exposure position (sub-scanning position of a main scanning line exposed in the main scanning direction) starting from the home position HP on the photosensitive drum 700.

If the current exposure position recognized based on the count value C is one of the positions $P_1$ to $P_n$, a corresponding one of the reference correction values $D_1$ to $D_n$ stored in the reference correction value holding unit 900 is used. For a position other than the positions $P_1$ to $P_n$, its correction value is calculated as follows.

More specifically, the correction value calculation unit 902 specifies positions (two of the positions $P_0$ to $P_n$) before and after the current exposure position recognized by the exposure position recognition unit 901. The correction value calculation unit 902 calculates a correction value for the current exposure position by performing linear interpolation using reference correction values (two of the reference correction values $D_0$ to $D_n$) corresponding to the specified positions (two of the positions $P_0$ to $P_n$) before and after the recognized current exposure position.

The exposure control unit 903 controls the exposure to the current exposure position by the exposure unit 702 based on the reference correction values stored in the reference correction value holding unit 900 and the correction value calculated for the current exposure position.

At the start of image formation, the photosensitive drum 700 starts rotating from the home position HP serving as a start point. If the current exposure position is the home position HP, the reference correction value $D_0$ stored in the reference correction value holding unit 900 is calculated (adopted) as the correction value of the current exposure position. If the current exposure position is one of the positions $P_1$ to $P_n$, a corresponding one of the reference correction values $D_1$ to $D_n$ stored in the reference correction value holding unit 900 is calculated (adopted) as the correction value of the current exposure position. For an exposure position between two of the positions $P_0$ to $P_n$, its correction value is calculated by performing linear interpolation using the reference correction values of positions before and after the target exposure position. For example, the correction value of an exposure position between the home position HP ($P_0$) and the position $P_1$ is calculated by linear interpolation using the reference correction value $D_0$ of the home position HP and the reference correction value $D_1$ of the position $P_1$.

In this manner, the correction value is calculated for each exposure position (position of each main scanning line) on the photosensitive drum 700. The exposure control unit 903 receives the calculated correction value. The exposure control unit 903 controls the exposure of the exposure unit 702 based on the received correction value. That is, the exposure control unit 903 controls the exposure to the current exposure position on the photosensitive drum 700.

However, an exposure position recognized by the exposure control unit 903 based on the count value C of the counter may deviate from an actual exposure position. This is because the rotational speed of the photosensitive drum 700 can vary due to, for example, the mechanical factor of the photosensitive drum 700, or force acting on the photosensitive drum 700 when paper enters between the photosensitive drum 700 and the transfer roller 705.

Assume that an exposure position $P_c$ recognized based on the count value C falls between the position $P_{n-1}$ and the position $P_n$, and an actual exposure position $P_r$ falls between position $P_n$ and the home position HP ($P_0$), as shown in FIG.

4. In this case, a correction value which should be calculated using the reference correction value $D_n$ of the position $P_n$ and the reference correction value $D_0$ of the home position HP is calculated using the reference correction value $D_{n-1}$ of the position $P_{n-1}$ and the reference correction value $D_n$ of the position $P_n$. When the exposure position $P_c$ recognized based on the count value C deviates from the actual exposure position $P_r$, the correspondence between the recognized exposure position $P_c$ and a reference correction value for use in the reference correction value holding unit 900 may become improper.

To solve this, according to the first embodiment, when the home position sensor 700b detects the home position member 700a, that is, home position HP, the exposure position recognition unit 901 clears the count value C of the counter 901a. The exposure position recognition unit 901 recognizes the current exposure position $P_c$ based on a subsequently obtained count value C. As a result, an improper correspondence between the exposure position $P_c$ recognized based on the count value C and a reference correction value in the reference correction value holding unit 900 returns to a proper one.

For example, when the actual exposure position $P_r$ precedes the exposure position $P_c$ recognized based on the count value C, it reaches the home position HP before the exposure position $P_c$ reaches it. That is, the home position HP is detected before the exposure position $P_c$ recognized based on the count value C reaches the home position HP. Upon detecting the home position HP, the count value C of the counter 901a is cleared. The exposure position $P_c$ based on the count value C is recognized again from the home position HP serving as a start point.

Thus, the exposure position $P_c$ recognized based on the count value C coincides with the actual exposure position $P_r$. In other words, an improper correspondence between the exposure position $P_c$ recognized based on the count value C and a reference correction value in the reference correction value holding unit 900 returns to a proper one.

However, immediately before and immediately after detecting the home position HP, the correction value $D_c(P_{c0})$ of the exposure position $P_{c0}$ changes from a correction value calculated using the reference correction values $D_n$ and $D_0$ to a correction value calculated using the reference correction values $D_0$ and $D_1$. Assume that the actual exposure position $P_r$ precedes the exposure position $P_c$ recognized based on the count value C, as shown in FIG. 4. $D_c(P_{c0})$ represents the correction value of the exposure position $P_{c0}$ before detecting the home position HP, and $D_c(P_{c1})$ represents the correction value of the exposure position $P_{c1}$ (actual exposure position) after detecting the home position HP. In this case, the difference Δ between the correction values $D_c(P_{c0})$ and $D_c(P_{c1})$ may increase regardless of sensitivity variations of the photosensitive drum 700. As the correction value difference Δ increases, a density difference may appear between main scanning lines as an image which degrades the image quality.

To solve this, the first embodiment executes processing to decrease, to a preset allowable change value α or less, the difference Δ between the correction values of exposure positions $P_c$ recognized immediately before and immediately after detecting the home position HP. The allowable change value α is the maximum value of a correction value change width at which no remarkable density change occurs in a formed image.

Figure 5:
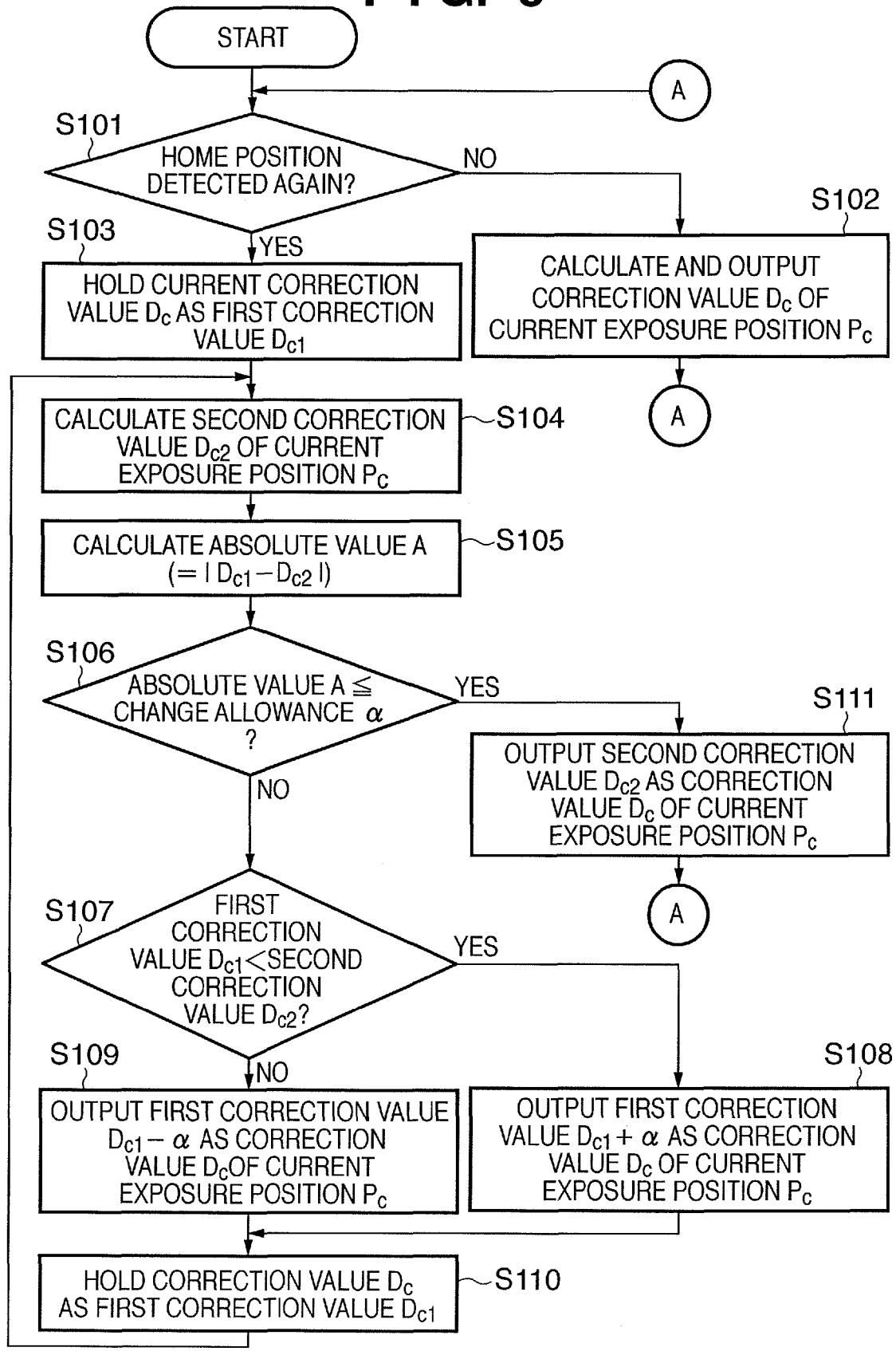
FIG. 5 is a flowchart showing the sequence of correction value calculation processing by a correction value calculation unit 902.

Correction value calculation processing executed by the correction value calculation unit 902 to calculate the correction value of the exposure position $P_c$ recognized based on the count value C will be explained with reference to FIG. 5. FIG. 5 is a flowchart showing the sequence of correction value calculation processing by the correction value calculation unit 902.

At the start of the process illustrated in FIG. 5, the photosensitive drum 700 is driven to rotate in the direction indicated by the arrow in FIG. 1. Accordingly, the photosensitive drum 700 starts rotating from the home position HP serving as a start point.

In step S101, the correction value calculation unit 902 determines, based on an output from the home position sensor 700b, whether the home position HP has been detected again after the start of the process. If no home position HP is detected again (NO in step S101), the process proceeds to step S102 in which the correction value calculation unit 902 calculates the correction value $D_c$ of the current exposure position $P_c$ recognized by the exposure position recognition unit 901 based on the count value C. Additionally, in step S102, the correction value calculation unit 902 outputs the correction value $D_c$ to the exposure control unit 903. In calculating the correction value $D_c$, the correction value calculation unit 902 specifies positions (two of positions HP and $P_n$) before and after the recognized current exposure position $P_c$. The correction value calculation unit 902 reads out, from the reference correction value holding unit 900, reference correction values (two of the reference correction values $D_0$ and $D_n$) corresponding to the respective two specified positions. The correction value calculation unit 902 calculates correction data $D_c$ for the current exposure position $P_c$ by linear interpolation using the two readout reference correction values. After outputting the correction value $D_c$, the correction value calculation unit 902 returns to step S101 to repetitively calculate correction data $D_c$ for the recognized current exposure position $P_c$ until the home position HP is detected again.

If the home position HP is detected again (YES in step S101), the process proceeds to step S103 in which the correction value calculation unit 902 holds the current correction value $D_c$ as the first correction value $D_{c1}$. The current correction value $D_c$ is a correction value obtained immediately before detecting the home position HP. Then, in step S104, the correction value calculation unit 902 calculates the second correction value $D_{c2}$ for the current exposure position $P_c$ recognized based on the count value of the counter 901a which restarts operation after clearing the count value C. The second correction value $D_{c2}$ is calculated by the same method as that in step S102. In step S105, the correction value calculation unit 902 calculates the absolute value A of the difference between the first correction value $D_{c1}$ and the second correction value $D_{c2}$.

The correction value calculation unit 902 determines whether the absolute value A is equal to or smaller than the allowable change value α (step S106). If the absolute value A is larger than the allowable change value α (NO in step S106), the process proceeds to step S107 in which the correction value calculation unit 902 determines whether the first correction value $D_{c1}$ is smaller than the second correction value $D_{c2}$. If the first correction value $D_{c1}$ is smaller than the second correction value $D_{c2}$ (YES in step S107), the process proceeds to step S108 in which the correction value calculation unit 902 outputs the sum of the first correction value $D_{c1}$ and allowable change value α as the correction value $D_c$ of the current exposure position $P_c$. If the first correction value $D_{c1}$ is equal to or larger than the second correction value $D_{c2}$ (NO in step S107), the process proceeds to step S109 in which the correction value calculation unit 902 outputs a difference obtained by subtracting the allowable change value α from the first correction value $D_{c1}$, as the correction value $D_c$ of the current exposure position $P_c$. Then, in step S110, the correction value calculation unit 902 holds the correction value $D_c$ obtained in step S108 or S109 as the first correction value $D_{c1}$. The correction value calculation unit 902 repeats the operations in step S104 and subsequent steps until the absolute value A of the difference between the first correction value $D_{c1}$ and the second correction value $D_{c2}$ becomes equal to or smaller than the allowable change value α.

If the absolute value A becomes equal to or smaller than the allowable change value α (YES in step S106), the process proceeds to step S111 in which the correction value calculation unit 902 outputs the second correction value $D_{c2}$ as the correction value $D_c$ of the current exposure position $P_c$. After outputting the second correction value, the correction value calculation unit 902 returns to step S101 to repetitively calculate the correction value $D_c$ of the current exposure position $P_c$ recognized based on the count value C (step S102) until the home position HP is detected again.

Figure 6:
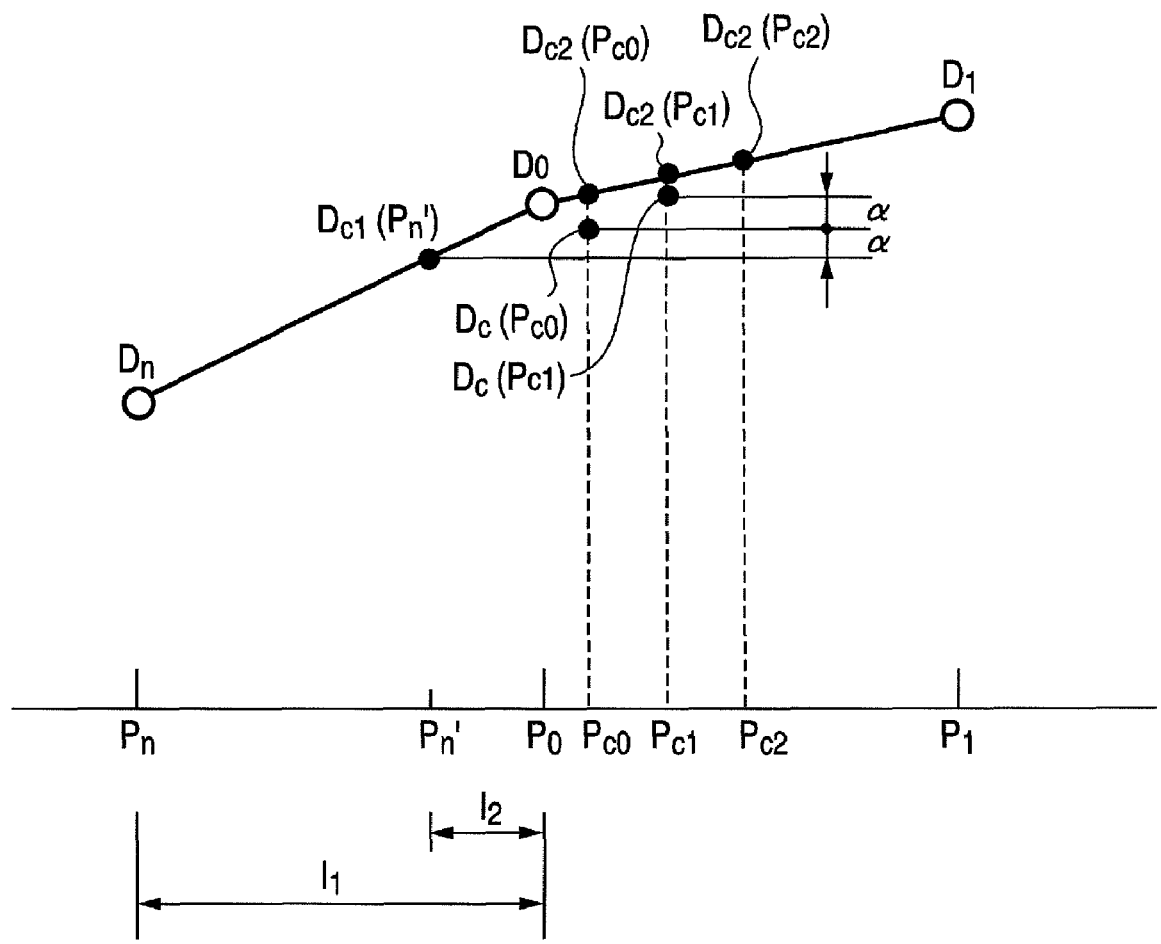
FIG. 6 is a graph schematically showing the transition of the correction value $D_c$ calculated by correction value calculation processing in FIG. 5 immediately after detecting a home position HP.

The transition of the correction value $D_c$ calculated by the above-described correction value calculation processing immediately after detecting the home position HP will be explained with reference to FIG. 6. FIG. 6 is a graph schematically showing the transition of the correction value $D_c$ calculated by correction value calculation processing in FIG. 5 immediately after detecting the home position HP.

Assume that the exposure position $P_c$ recognized based on the count value C is a position $P_{n'}$ between the position $P_n$ and the home position HP when the home position HP is detected, as shown in FIG. 6. Assume that the actual exposure position $P_r$ precedes the exposure position $P_c$ recognized based on the count value C. The interval between the home position HP ($P_0$) and the exposure position $P_c$ recognized based on the count value C is a distance $I_2$ smaller than the distance $I_1$.

In this case, when the home position HP is detected, the absolute value A of the difference between the first correction value $D_{c1}$ and the second correction value $D_{c2}$ is larger than the allowable change value α, and the first correction value $D_{c1}$ is smaller than the second correction value $D_{c2}$. The first correction value $D_{c1}$ is a correction value immediately before detecting the home position, that is, the correction value $D_{c1}(P_{n'})$ of the exposure position $P_{n'}$. The second correction value $D_{c2}$ is the correction value $D_{c2}(P_c)$ of the exposure position $P_{c0}$ recognized first based on the count value C of the counter 901a which restarts operation after clearing the count value C. Immediately after detecting the home position HP, the exposure position $P_{c0}$ recognized based on the count value C substantially coincides with the actual exposure position $P_r$. The correction value calculation unit 902 outputs the sum of the first correction value $D_{c1}(P_{n'})$ and allowable change value α as the correction value $D_c(P_{c0})$ of the current exposure position $P_{c0}$ (step S108). The correction value calculation unit 902 holds the correction value $D_c(P_{c0})$ as the first correction value $D_{c1}$ (step S110).

The correction value calculation unit 902 recognizes the exposure position $P_{c1}$ based on the count value C of the running counter 901a to calculate the second correction value $D_{c2}(P_{c1})$ of the recognized exposure position $P_{c1}$ (step S104). If the absolute value A ($=|D_{c1}-D_{c2}|$) is larger than the allowable change value α, and the first correction value $D_{c1}$ is smaller than the second correction value $D_{c2}$, the correction value calculation unit 902 similarly outputs the sum of the first correction value $D_{c1}$ and allowable change value α as the correction value $D_{c2}(P_{c1})$ of the current exposure position $P_{c1}$.

Assume that the absolute value A becomes equal to or smaller than the allowable change value α when the exposure position $P_{c2}$ next to the exposure position $P_{c1}$ is recognized as the exposure position $P_c$. Then, the correction value calculation unit 902 outputs the second correction value $D_{c2}(P_{c2})$ of the exposure position $P_{c2}$ as the correction value $D_c$ of the exposure position $P_{c2}$ (step S111). In this case, the correction value $D_c$ is calculated by linear interpolation using the reference correction value $D_0$ of the home position HP and the reference correction value $D_1$ of the next position $P_1$.

Subsequently, the correction value calculation unit 902 calculates the correction value $D_c$ of the exposure position $P_c$ recognized based on the count value C of the counter 901a (step S102). In this case, the correction value calculation unit 902 specifies positions before and after the current exposure position $P_c$ recognized based on the count value C. The correction value calculation unit 902 reads out, from the reference correction value holding unit 900, reference correction values corresponding to the respective two specified positions. The correction value calculation unit 902 calculates the correction value $D_c$ of the current exposure position $P_c$ by linear interpolation using the two readout reference correction values.

The correction value $D_c$ of the exposure position $P_c$ increases stepwise until the absolute value A becomes equal to or smaller than the allowable change value α. The correction values of exposure positions $P_c$ immediately before and immediately after detecting the home position HP do not become greatly different from each other. Neither large density difference appears between main scanning lines, nor image quality is degraded.

Second Embodiment

Figure 7:
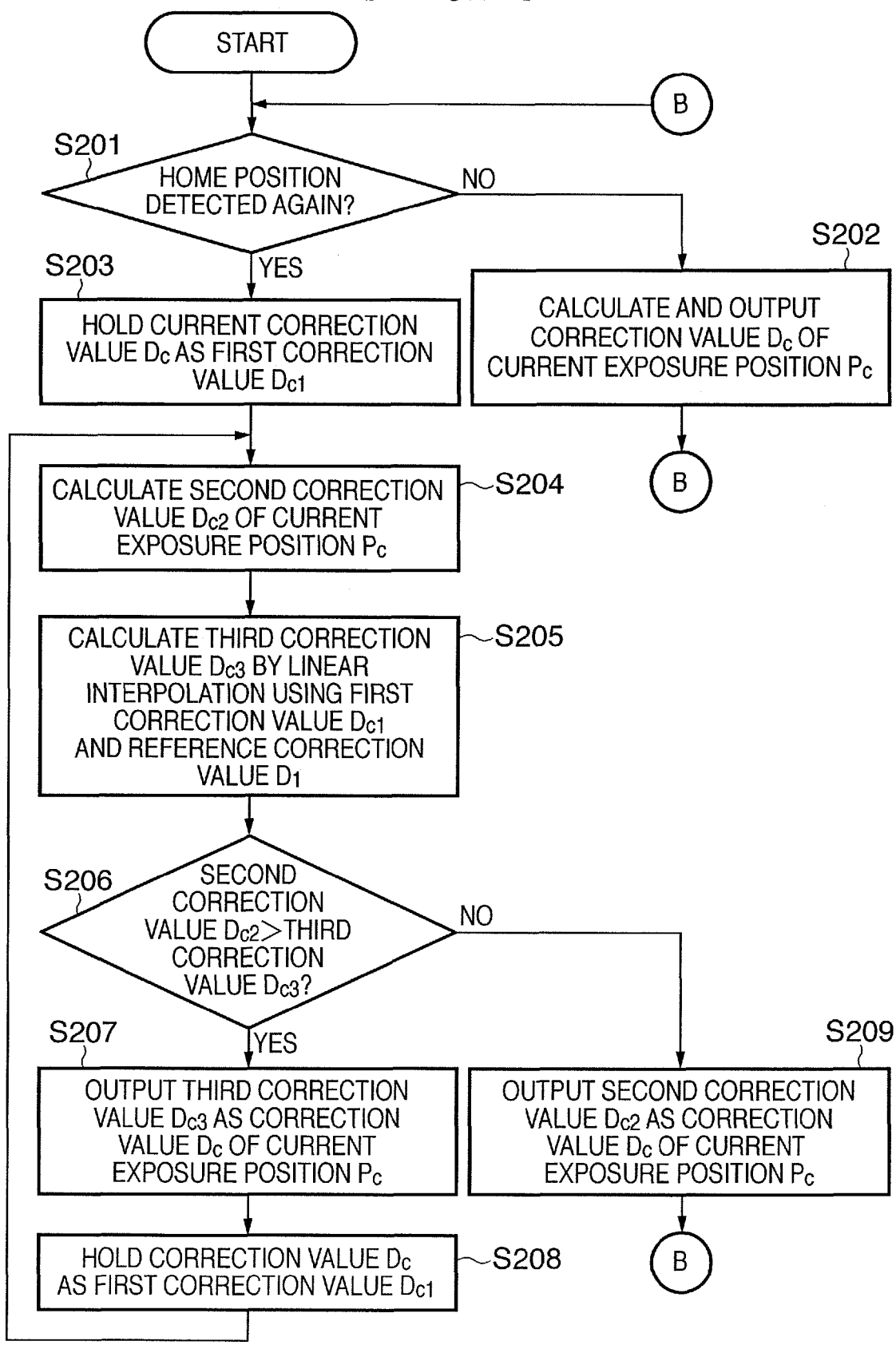
FIG. 7 is a flowchart showing the sequence of correction value calculation processing in an image forming apparatus according to the second embodiment of the present invention.

The second embodiment of the present invention will be described with reference to FIG. 7. FIG. 7 is a flowchart showing the sequence of correction value calculation processing in an image forming apparatus according to the second embodiment of the present invention.

The second embodiment has the same arrangement as that in the first embodiment, and a description thereof will not be repeated. The same reference numerals denote the same blocks or members. Only a difference of the second embodiment from the first embodiment will be explained.

More specifically, the second embodiment executes correction value calculation processing different from that in the first embodiment. This correction value calculation processing is applied when an actual exposure position $P_r$ precedes an exposure position $P_c$ recognized based on a count value C, similar to the first embodiment.

The correction value calculation processing will be described with reference to FIG. 7.

At the start of process shown in FIG. 7, in step S201, a correction value calculation unit 902 determines, based on an output from a home position sensor 700b, whether a home position HP has been detected again after the start of drawing. If no home position HP is detected again (NO in step S201), the process proceeds to step S202 in which the correction value calculation unit 902 calculates a correction value $D_c$ for the current exposure position $P_c$ recognized by an exposure position recognition unit 901 based on the count value C. Additionally, in step S202, the correction value calculation unit 902 outputs the correction value $D_c$ to an exposure control unit 903. Calculation of the correction value $D_c$ is the same as correction value calculation processing in step S102 of the first embodiment. After outputting the correction value $D_c$, the correction value calculation unit 902 returns to step S201 to repetitively calculate correction data $D_c$ for the recognized current exposure position $P_c$ until the home position HP is detected again.

If the home position HP is detected again (YES in step S201), the process proceeds to step S203 in which the correction value calculation unit 902 holds the current correction value $D_c$ as the first correction value $D_{c1}$. The current correction value $D_c$ is a correction value obtained immediately before detecting the home position HP. Then, in step S204, the correction value calculation unit 902 calculates the second correction value $D_{c2}$ of the current exposure position $P_c$ recognized based on the count value of a counter 901a which restarts operation after clearing the count value C. The second correction value $D_{c2}$ is calculated by the same method as that in step S202. In step S205, the correction value calculation unit 902 calculates the third correction value $D_{c3}$ by linear interpolation using the first correction value $D_{c1}$ and the reference correction value $D_1$ of the position $P_1$ next to the home position HP.

The correction value calculation unit 902 determines whether the second correction value $D_{c2}$ is larger than the third correction value $D_{c3}$ (step S206). If the second correction value $D_{c2}$ is larger than the third correction value $D_{c3}$ (YES in step S206), the process proceeds to step S207 in which the correction value calculation unit 902 outputs the third correction value $D_{c3}$ as the correction data $D_c$ for the current exposure position $P_0$. Then, in step S208, the correction value calculation unit 902 holds the correction value $D_c$ as the first correction value $D_{c1}$, and returns to step S204. The correction value calculation unit 902 repeats the processes in step S204 and subsequent steps until the second correction value $D_{c2}$ becomes equal to or smaller than the third correction value $D_{c3}$.

If the second correction value $D_{c2}$ becomes equal to or smaller than the third correction value $D_{c3}$ (NO in step S206), the process proceeds to step S209 in which the correction value calculation unit 902 outputs the second correction value $D_{c2}$ as the correction value $D_c$ of the current exposure position $P_c$. After outputting the second correction value, the correction value calculation unit 902 returns to step S201 to repetitively calculate the correction value $D_c$ of the current scanning position $P_c$ recognized based on the count value C of the counter 901a until the home position HP is detected again.

Third Embodiment

Figure 8:
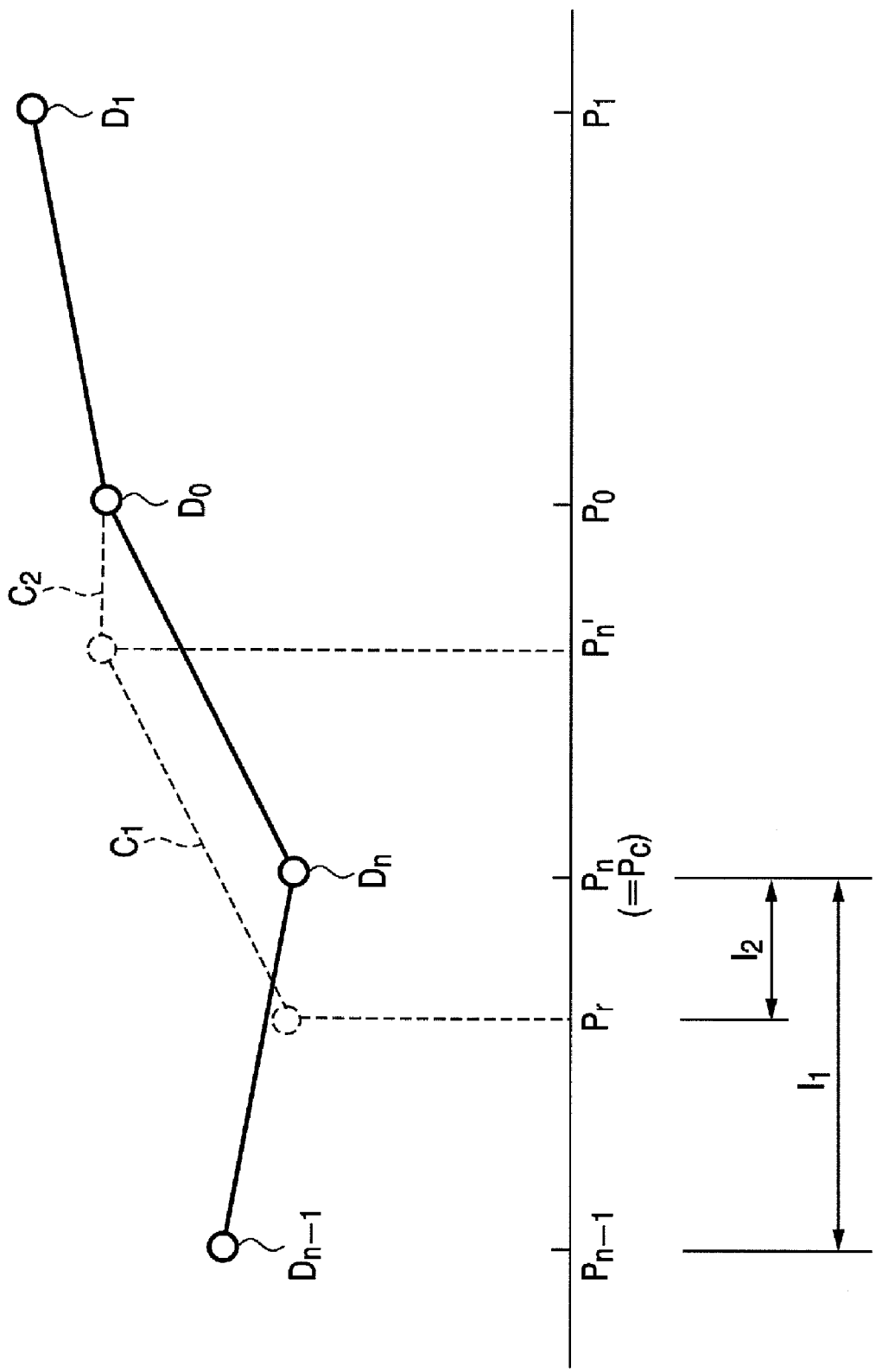
FIG. 8 is a graph schematically showing the transition of the correction value $D_c$ calculated by correction value calculation processing for an exposure position $P_c$ immediately after detecting the home position HP in an image forming apparatus according to the third embodiment of the present invention.
Figure 9:
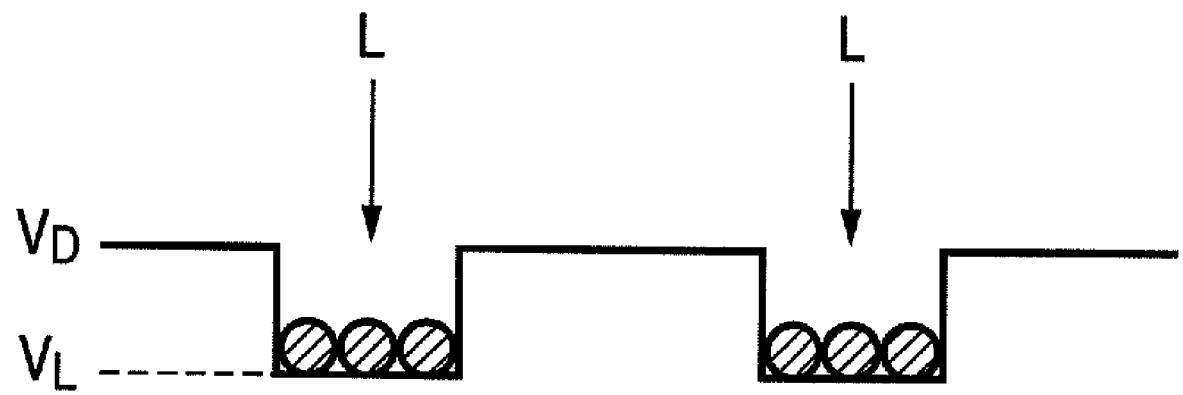
FIG. 9 is a view schematically showing the potential relationship between a portion irradiated with a laser beam and an unirradiated portion on a photosensitive drum.
Figure 10:
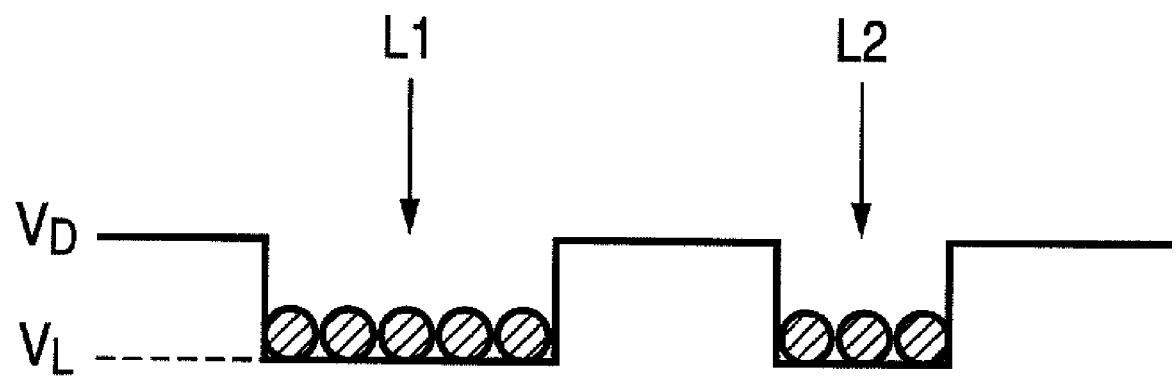
FIG. 10 is a view schematically showing toner attachment states at portions irradiated with laser beams of different irradiation pulse widths on the photosensitive drum.
Figure 11:
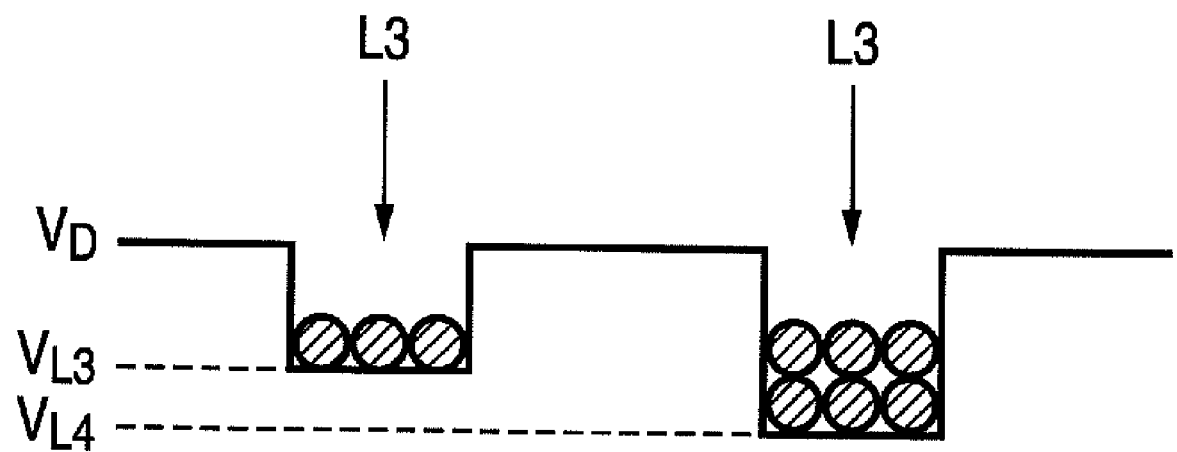
FIG. 11 is a view showing toner attachment states at portions irradiated with laser beams of the same light quantity on the photosensitive drum.
Figure 12A:
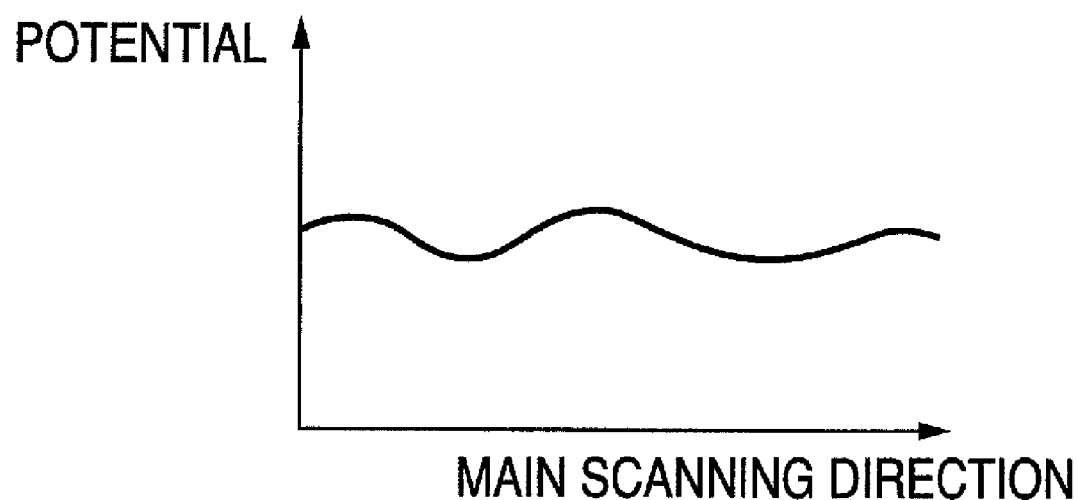
FIGS. 12A and 12B are graphs schematically showing sensitivity variations of the photosensitive drum in the main scanning direction and sub-scanning direction.
Figure 12B:
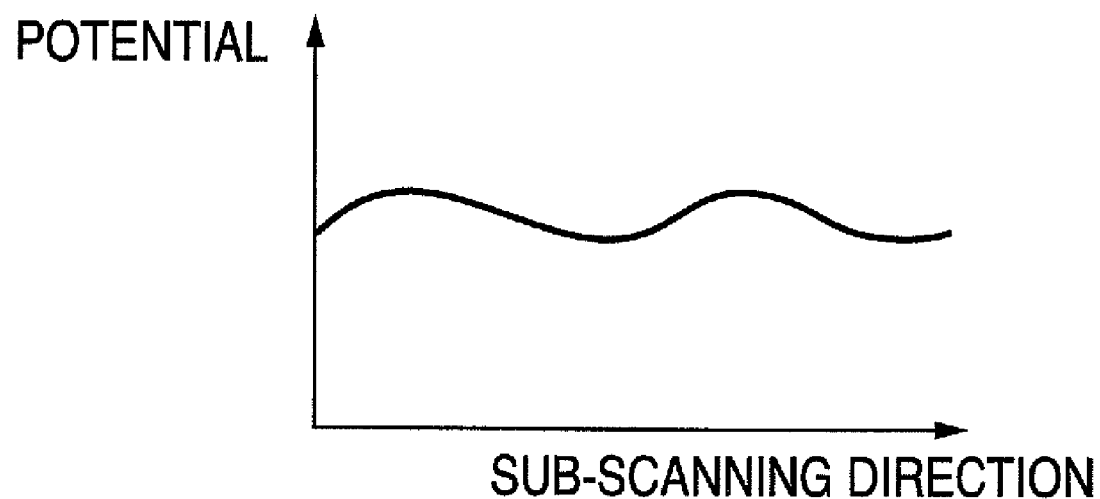

The third embodiment of the present invention will be described with reference to FIG. 8. FIG. 8 is a graph schematically showing the transition of the correction value $D_c$ calculated by correction value calculation processing for an exposure position $P_c$ immediately after detecting a home position HP in an image forming apparatus according to the third embodiment of the present invention.

The third embodiment has the same arrangement as that in the first embodiment, and a description thereof will not be repeated. The same reference numerals denote the same blocks or members. Only a difference of the third embodiment from the first embodiment will be explained.

The first and second embodiments are applied to a case where the actual exposure position $P_r$ precedes, by the distance $I_2$ ($<I_1$), the exposure position $P_c$ recognized based on the count value C when the home position HP is detected.

To the contrary, the third embodiment is applied to a case where the actual exposure position $P_r$ is behind, by the distance $I_2$ ($<I_1$), the exposure position $P_c$ recognized based on the count value C. In other words, the third embodiment is applied to a case where the exposure position $P_c$ recognized based on the count value C precedes the actual exposure position $P_r$.

For example, as shown in FIG. 8, when the exposure position $P_c$ recognized based on the count value C is a position $P_n$, the actual exposure position $P_r$ is behind the position $P_n$. The interval between the actual exposure position $P_r$ and the exposure position $P_c$ is the distance $I_2$.

In this case, the correction value $D_c$ of the exposure position $P_c$ is calculated by linear interpolation using the reference correction value $D_n$ of the position $P_n$ and the reference correction value $D_0$ of the home position HP. After recognizing the home position HP as the exposure position $P_c$, the correction value $D_c$ of the exposure position $P_c$ is calculated by linear interpolation using the reference correction value $D_0$ of the home position HP and the reference correction value $D_1$ of the next position $P_1$. When, however, it is recognized that the exposure position $P_c$ is the home position HP, the actual exposure position $P_r$ falls between the position $P_n$ and the home position HP.

Hence, a correction value which should be calculated by linear interpolation using the reference correction value $D_n$ of the position $P_n$ and the reference correction value $D_0$ of the home position HP is calculated by linear interpolation using the reference correction value $D_0$ of the home position HP and the reference correction value $D_1$ of the next position $P_1$. That is, when the exposure position $P_c$ recognized based on the count value C precedes the actual exposure position $P_r$, the correspondence between the recognized exposure position $P_c$ and a reference correction value in a reference correction value holding unit 900 becomes improper.

To solve this, according to the third embodiment, the correction value $D_c$ of the exposure position $P_c$ is calculated by linear interpolation using the reference correction value $D_n$ of the position $P_n$ and the reference correction value $D_0$ of the home position HP until the home position HP is recognized as the exposure position $P_c$. The reference correction value $D_0$ of the home position HP is set as the correction value $D_c$ of the exposure position $P_c$ until the home position HP is actually detected after it is recognized as the exposure position $P_c$. Thus, a correction value along correction value curves $C_1$ and $C_2$ indicated by dotted lines is calculated as the correction value of the actual exposure position $P_r$.

The correspondence between the recognized exposure position $P_c$ and a reference correction value for use in the reference correction value holding unit 900 returns to a proper one when a home position sensor 700b detects the home position HP. Correction values calculated for exposure positions before and after detecting the home position HP do not become greatly different from each other. Neither a large density difference appears between main scanning lines, nor is image quality degraded.

The above-described embodiments suppress the difference between correction values calculated before and after the home position sensor 700b detects the home position HP. However, for example, when the sensitivity of the photosensitive drum 700 hardly varies, the difference between correction values calculated before and after the home position sensor 700b detects the home position HP is expected not to become large. In this case, the correction value of the exposure position may be set to the reference correction value $D_0$ when the home position sensor 700b detects the home position HP regardless of whether the actual exposure position $P_r$ precedes the recognized exposure position $P_c$.

The present invention can properly correct the exposure to a photosensitive body in accordance with sensitivity variations of the photosensitive body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-246002 filed on Sep. 11, 2006, which is hereby incorporated by reference herein in its entirety.

What is claimed is:

1. An image forming apparatus comprising:
    a photosensitive body including a reference mark for specifying a reference position of the photosensitive body when the photosensitive body rotates;
    an exposure unit configured to expose a surface of the photosensitive body;
    a detection unit configured to detect the reference mark;
    a storage unit configured to store correction value for correcting the exposure amount, the correction value corresponds to respective positions of the surface of the photosensitive body in a rotational direction;
    a recognition unit configured to recognize a exposure position on the photosensitive body based on a timing in which the detection unit detects the reference mark;
    a calculation unit configured to calculate the correction value by use of the correction value stored in the storage unit and the exposure position recognized by the recognition unit; and
    a control unit configured to control exposure amount of the exposure unit based on the correction value calculated by the calculation unit,
    wherein the control unit controls, in the case where a difference between a first correction value being correction value calculated by the calculation unit immediately before detecting the reference mark by the detection unit and a second correction value being correction value calculated by the calculation unit after detecting the reference mark by the detection unit is an allowable change value or less, the exposure amount of the exposure unit based on the second correction amount, and controls, in the case where the difference is more than the allowable change value, the exposure amount of the exposure unit based on the first correction amount and the allowable change value.

2. The image forming apparatus according to claim 1, wherein the exposure unit comprises a light source emitting light in accordance with image data and a rotating polygonal mirror deflecting and scanning the light emitted from the light source, and exposes the photosensitive body by use of the deflected and scanned light, and
    wherein the correction value corresponding to each of a plurality of scanning lines formed on the photosensitive body by the exposure unit is stored
    in the storage unit.

3. The image forming apparatus according to claim 1, wherein the exposure unit comprises a light source emitting light in accordance with image data and a rotating polygonal mirror deflecting and scanning the light emitted from the light source, and exposes the photosensitive body by use of the deflected and scanned light, and
    wherein the correction amount corresponding to each of groups including a plurality of scanning lines formed on the photosensitive body by the exposure unit is stored in the storage unit.

4. The image forming apparatus according to claim 3, wherein the control unit calculates the correction amount of first scanning line that the correction amount is not assigned based on the correction amount of second scanning line that the correction amount is assigned, and the second scanning line is scanned immediately before and immediately after scanning the first scanning lines.

5. The image forming apparatus according to claim 1, wherein the control unit controls the exposure value of the exposure unit by controlling an intensity the light emitted from the exposure unit for each position of the surface of the photosensitive body.

* * * * *